(12) United States Patent
Palki et al.

(10) Patent No.: US 10,607,263 B2
(45) Date of Patent: Mar. 31, 2020

(54) COMPUTERIZED SYSTEMS AND METHODS FOR AUTHENTICATING USERS ON A NETWORK DEVICE VIA DYNAMICALLY ALLOCATED AUTHENTICATING STATE MACHINES HOSTED ON A COMPUTER NETWORK

(71) Applicant: OATH INC., New York, NY (US)

(72) Inventors: Manoj Palki, Sunnyvale, CA (US); Alice Gutman, Sunnyvale, CA (US); Gabriel Maganis, Sunnyvale, CA (US); Francis Hsu, Sunnyvale, CA (US)

(73) Assignee: OATH INC., New York, NY (US)

( * ) Notice: Subject to any disclaimer, the term of this patent is extended or adjusted under 35 U.S.C. 154(b) by 230 days.

(21) Appl. No.: 15/197,806

(22) Filed: Jun. 30, 2016

(65) Prior Publication Data
US 2018/0007049 A1 Jan. 4, 2018

(51) Int. Cl.
G06Q 30/02 (2012.01)
H04L 29/06 (2006.01)
G06F 21/31 (2013.01)

(52) U.S. Cl.
CPC ......... *G06Q 30/0277* (2013.01); *G06F 21/31* (2013.01); *H04L 63/08* (2013.01);
(Continued)

(58) Field of Classification Search
CPC ... H04L 63/10; H04L 63/083; H04L 63/0853; H04L 63/0861; H04L 63/18; H04L 63/08; G06Q 30/0277; G06F 21/31
See application file for complete search history.

(56) References Cited

U.S. PATENT DOCUMENTS

2006/0185021 A1* 8/2006 Dujari ............... H04L 63/08 726/27
2010/0285781 A1* 11/2010 Dai .................. H04M 3/42 455/414.1

(Continued)

OTHER PUBLICATIONS

John R. Reuning, "Applying term weight techniques to event log analysis for intrusion detection," Jul. 2004, pp. 1-26. (Year: 2004).*

(Continued)

*Primary Examiner* — Luu T Pham
*Assistant Examiner* — Canh Le
(74) *Attorney, Agent, or Firm* — James J. DeCarlo; Greenberg Traurig, LLP

(57) ABSTRACT

Disclosed are systems and methods for improving interactions with and between computers in an authentication system supported by or configured with personal computing devices, servers and/or platforms. The systems interact to identify and retrieve data across platforms, which data can be used to improve the quality of data used in processing interactions between or among processors in such systems. The disclosed systems and methods provide advanced, computerized security features that dynamically, in real-time, determine parameters that must be entered in order for a user to login to a system or platform, as well as the quantity and order such parameters must be entered. The disclosed systems and methods involve computerized mechanisms for authenticating a user or device for which access to a web-based resource is desired. Requested credentials in accordance with the dynamically determined manner in which such credentials are automatically determined and requested must be appropriately entered.

18 Claims, 8 Drawing Sheets

(52) U.S. Cl.
CPC .. *H04L 63/0861* (2013.01); *G06F 2221/2117* (2013.01); *G06F 2221/2133* (2013.01); *H04L 2463/082* (2013.01)

(56) References Cited

U.S. PATENT DOCUMENTS

| | | | |
|---|---|---|---|
| 2011/0023088 A1* | 1/2011 | Ko | H04L 63/102 726/3 |
| 2012/0023558 A1* | 1/2012 | Rafiq | H04L 63/08 726/6 |
| 2013/0283346 A1* | 10/2013 | Sun | H04L 9/00 726/3 |
| 2016/0337403 A1* | 11/2016 | Stoops | H04L 63/0861 |
| 2016/0381080 A1* | 12/2016 | Reddem | H04L 63/0884 726/1 |
| 2017/0118533 A1* | 4/2017 | Holtz | G06Q 30/0255 |

OTHER PUBLICATIONS

Zengwen Yuan et al., "A Machine Leaqrning Based Approach to Mobile Network Analysis," 2018, IEEE, pp. 1-9 (Year: 2018).*

* cited by examiner

COMPUTERIZED SYSTEMS AND METHODS FOR AUTHENTICATING USERS ON A NETWORK DEVICE VIA DYNAMICALLY ALLOCATED AUTHENTICATING STATE MACHINES HOSTED ON A COMPUTER NETWORK

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to privacy and security and to improving the performance of authentication server systems and/or platforms by modifying the capabilities and enabling non-native functionality to such systems and/or platforms by providing advanced, computerized security features that dynamically, in real-time, determine the parameters that must be entered in order for a user to login to a system or platform, as well as the quantity and order such parameters must be entered.

SUMMARY

The present disclosure provides systems and methods for authenticating users on a network based on a dynamically determined combination of credentials that must be received in order for a user to gain entry to a web-based resource, system or device. The disclosed systems and methods are modeled as an authentication flow based upon a configurable finite state machine (FSM), which provides flexibility, scalability, security and concisely definable means for user authentication.

The disclosed systems and methods configure the FSM with a variety (e.g., plurality) of mechanisms for authentication, which include, but are not limited to, password, out-of-band communications/verification, CAPTCHA, biometrics, hardware tokens, and the like. Each automatically determined and applied authentication mechanism is electronically tied to various states within the FSM. When coupled to a device, system, service or platform, the FSM enables a dynamically determined authentication flow to be presented to the user, such that in order for the user to gain entry to the requested device, platform or service, the user must efficiently and accurately provide the requested credentials at each transition stage (or state) of the FSM, where each transition stage corresponds to an independent authentication mechanism. In some embodiments, the requested credentials for a transition stage can be determined and presented to a user based on information derived or associated with a user, which can include, but is not limited to, the identity of the user, the previously entered credential by the user, the manner in which such credential was entered, and the like, or some combination thereof, as discussed in more detail below.

The instant disclosure provides novel, advanced and improved authentication methods and systems structured as dynamically determined transitions through a FSM. As discussed in more detail below, the FSM can be embodied as a computer program applied to a user device or server device, such that the dynamically determined transitions are not only determined, created, derived, or otherwise identified via software executing on a device, but also applied by such executing device. In some embodiments, either in combination or the alternative, the FSM can be embodied as a circuit model, where each transition within the FSM is implemented via a sequential logic circuit(s).

In accordance with one or more embodiments, a method is disclosed which provides advanced, computerized security features for an authentication process that dynamically, in real-time, determines the parameters that must be entered in order for a user to login to a system or platform, as well as the quantity and order such parameters must be entered. According to some embodiments, the disclosed method is implemented through a software and/or hardware designed FSM, where the quantity and order of such parameters are tied to transition states within the FSM.

In accordance with one or more embodiments, a non-transitory computer-readable storage medium is provided, the computer-readable storage medium tangibly storing thereon, or having tangibly encoded thereon, computer readable instructions that when executed cause at least one processor to perform a method for electronically authenticating users on media platforms, content providers, local and/or web-enabled devices, providers or services via a dynamically allocated authenticating state machine(s) hosted on a computer network.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DESCRIPTION OF EMBODIMENTS

Figure 1:
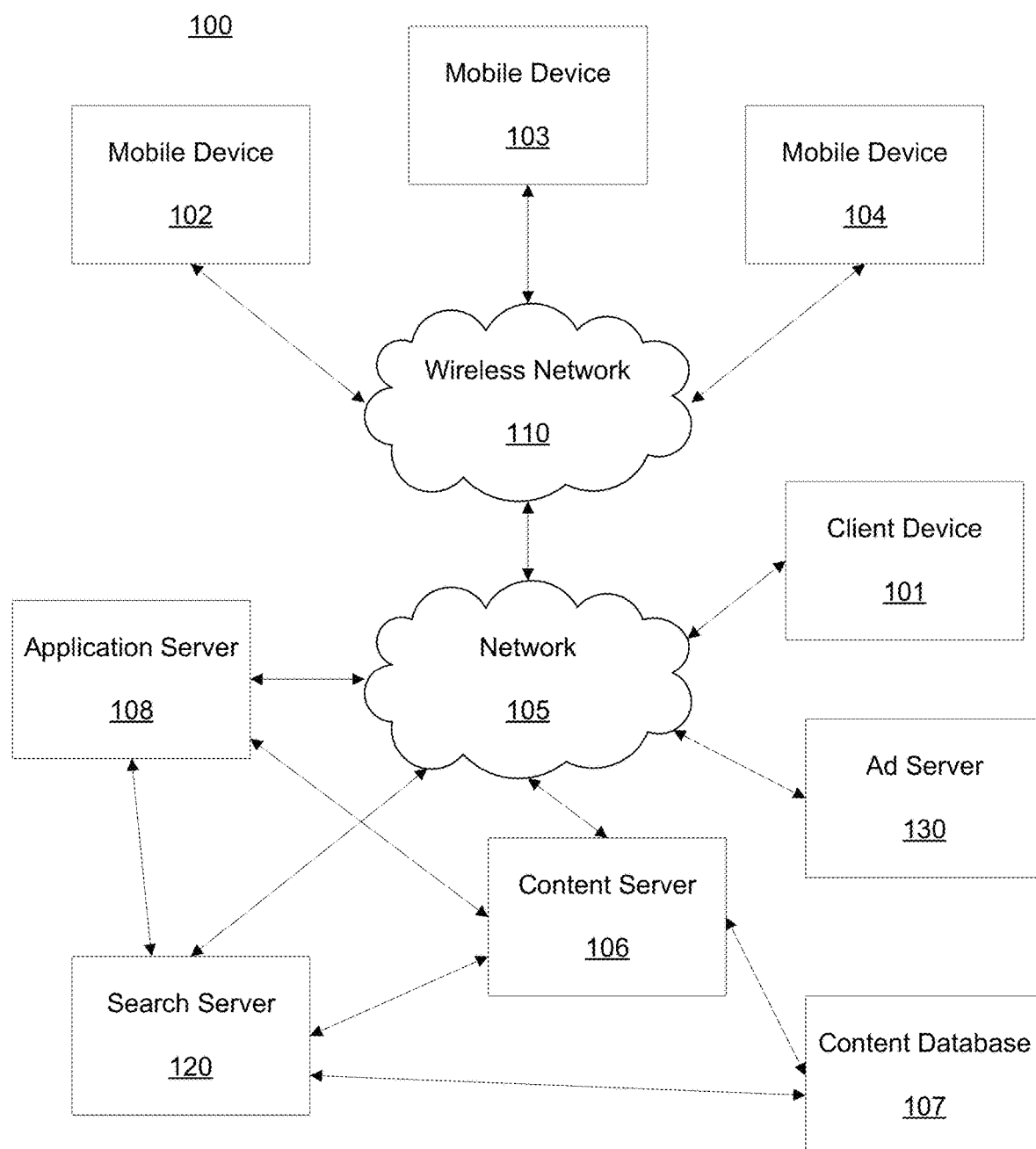
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or sender or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a simple smart phone, phablet or tablet may include a numeric keypad or a display of limited functionality, such as a monochrome liquid crystal display (LCD) for displaying text. In contrast, however, as another example, a web-enabled client device may include a high-resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more electronic messages, such as via email, for example Yahoo!® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device may also include or execute an application to communicate content, such as, for example, textual content, image content, video content, multimedia content, or the like. A client device may also include or execute an application to perform a variety of possible tasks, such as browsing, editing, searching, playing, streaming or displaying various forms of content, including locally stored or uploaded content and and/or messages. The foregoing is provided to illustrate that claimed subject matter is intended to include a wide range of possible features or capabilities.

The principles described herein may be embodied in many different forms. Conventional user authentication systems and processes on the internet are moving from a simple password based scheme to one where a number of methods are used to identify the user. These methods include, but are not limited to, username/password, a pin code or other character sequence (e.g., a PIN—for example, TouchID™), a character sequence or other type of log-in credential entry set by the user, platform or service, system administrator or device for accessing the user device, out-of-band communications (e.g., phone or SMS verification, email verification), biometrics (e.g., fingerprints, iris scan, facial recognition, voice recognition, or other biometrics), push notifications, and the like. This is compounded by the need for multi-factor authentication where two or more of the above mechanisms are used in conjunction before allowing the user to login.

By way of a non-limiting example, the Linux-PAM (Pluggable Authentication Module) and X/Open Single Sign-on Service (XSSO) products offers the ability to configure multiple authentication modules to establish the identity of the user. The configuration of these products/systems is built as a predetermined linear specification of the modules that must be satisfied in the given order. As discussed herein, such linear approach is not only limited in scope and scalability, but offers limited to no flexibility in how an authentication scheme or mechanism can be implemented. As evidenced by the disclosure herein, the disclosed authentication systems and methods can be implemented in a branching, looping or other arbitrary state, via implementation of a finite state machine (FSM) performing the authentication, such that improved, if not previously achieved levels of flexibility, scalability, security and concisely definable means for user authentication are achieved.

As understood by those of skill in the art, a finite-state machine (FSM), referred to interchangeably as a state machine, is a mathematical model of computation that governs or, more specifically, defines the design and implementation of both computer programs and sequential logic circuits. A FSM can be configured as a number of finite states. A FSM is in only one state at a time; the state it is in at any given time is called the current state. A FSM can change from one state to another when initiated by a triggering event or condition—referred to as a transition, as discussed in more detail below. As such, a FSM is defined by a list of its states, and the triggering condition for each transition.

A FSM's behavior can be observed in many devices in modern society that perform a sequence of actions depending on a sequence of events with which they are defined. FSMs can model a large number of problems, among which are electronic design automation, communication protocol design, language parsing and other engineering applications. In some embodiments, with reference to artificial intelligence research or machine learning architectures, a single FSM can be configured as a hierarchy of state machines that have been used to describe neurological systems. Implementations of FSMs within the scope of the instant application will be discussed in more detail below, for example, with reference to FIG. 5.

It should be understood that while the discussion herein generally refers to FSMs (or state machines), any type of known or to be known state machine or state machine configuration can be implemented by the disclosed systems and methods without departing from the scope of the instant disclosure. For example, the disclosed state machine implementation can be embodied as, but not limited to, a state/event table, Unified modeling language (UML) state machine, specification and description language (SDL) state machines, and the like, as well as a Turing machine. Further, the disclosed state machine references herein can include any combination of subdivisions of state machines, such as, for example, transducers, acceptors, classifiers and sequencers.

According to embodiments, the instant disclosure provides novel, technologically based systems and methods for improved authentication of users on a network based on a dynamically determined combination of requested, entered, and ultimately approved credentials, thereby improving the fields of network and application security and user privacy. The disclosed systems and methods are modeled as an authentication flow based upon a configurable FSM. The FSM is configured with a variety (e.g., plurality) of mechanisms for authentication (e.g., password, out-of-band communications/verification, CAPTCHA, biometrics, hardware tokens, and the like), where each is electronically tied to various states within the FSM. When coupled to a device, system, service or platform, the FSM enables a dynamically determined authentication flow to be presented to the user, such that in order for the user to gain entry to the requested device, platform or service, the user must efficiently and accurately provide the requested credentials at each transition stage (or state) of the FSM, where each transition stage corresponds to an independent authentication mechanism.

In some embodiments, as discussed in more detail below, the requested credentials for a transition stage can be determined and presented to a user based on information derived or associated with a user, which can include, but is not limited to, the identity of the user, the previously entered credential by the user (e.g., the information or data/metadata associated with the user's response to a login request from a previous state within the FSM), the manner in which such credential was entered, and the like, or some combination thereof, as discussed in more detail below.

According to some embodiments, as evidenced by the disclosure herein, in order to remedy the seemingly ubiquitous malicious threats to user account information from users, malware and otherwise corrupted information systems, the disclosed systems and methods employ technological advancements, via the states and transitions of the implemented FSM, that add some "friction" to the login process or flow. Such friction can cause a bot or script to fail since the added "friction" provides an authentication step/state that can be automatically determined and applied based on the network, user and/or device behavior being observed during an authentication process.

For example, if a user is determined to be entering credentials too fast (e.g., at a millisecond pace that a user typically cannot perform—e.g., at or above a threshold level), then a CAPTCHA can be presented as a dynamically created and applied state between FSM transitions. In another non-limiting example, a CAPTCHA can be shown twice in a row, or between random states of the FSM depending on the activity occurring during the login process. As discussed in more detail below, such "friction" states can be introduced based on a variety of factors including, but not limited to, network characteristics, device characteristics, user behavior, user identity, security level of a requested secure resource, digital rights of a resource, a type of web-based resource, and the like, or some combination thereof. Thus, according to some embodiments, the same user could potentially see different flows based on their intended destination.

Thus, according to some embodiments, the disclosed systems and methods provide advanced, computerized security features for an authentication process that dynamically, in real-time, determines the parameters that must be entered in order for a user to login to a system or platform, as well as the quantity and order such parameters must be entered. Upon satisfaction of the authentication/login process discussed herein, a user will then be granted access to the electronic, web-based resource protected by the authentication systems and methods.

As discussed herein, web-based resources are secure resources, and are to be understood to include, and are not limited to, any resource on the Internet, intranet, a network, a local device, web-based device, or any other location, such as, but not limited to, web pages, web sites, web platforms, applications, databases and/or services hosted by backend servers, cloud-based systems and/or other types of known or to be known web-based platforms, and any other type of online platform, system or service that requires a user to enter a type of personal credential to gain access. For example, a non-limiting web-based resource for purposes of this disclosure can be web-mail, such as Yahoo! Mail®. According to some embodiments, the resources need not be web-based, as they can be locally stored resources on a local or connected drive, disk, or other type of local storage or retrieval point. For purposes of this disclosure, reference will be made to web-based resources; however, each embodiment should be understood to refer to any type of resource that is accessible by a computing device, either without or without a browser or application program.

Figure 3:
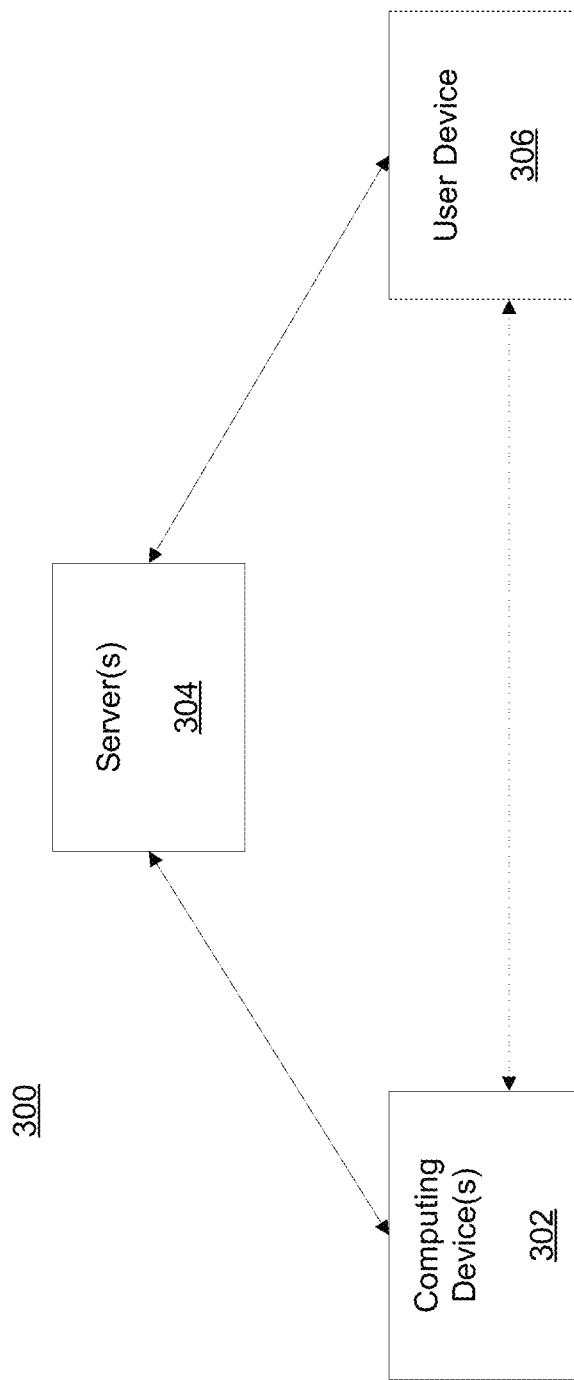
FIG. 3 depicts a non-limiting block diagram example of a login procedure and components required for such in accordance with some embodiments of the present disclosure.

By way of a non-limiting example, as illustrated in FIG. 3, the disclosed systems and methods provide an authentication (or login) diagram/procedure 300 for authenticating a user attempting to access a web-based resource. The discussion of FIG. 3 herein is solely for explanatory purposes, as the detailed discussion of the disclosed systems and methods of the present disclosure will be discussed in more detail blow.

As in FIG. 3, user Bob is surfing the internet using a browser/application installed on his computing device 302 and comes to a web-based resource page hosted by server 304. As discussed above, the web-based resource can be any type known or to be known electronic device, service, platforms, and any other type of online platform, system or service that requires a user to enter a type of personal or identifying credential to gain access. Therefore, for purposes of this example, server 304 can be Yahoo!®'s backend server that hosts the Flickr® site. Computing device 302, for purposes of this example is, but is not limited to, a desktop computer, personal computer, laptop or workstation. As discussed above and in more detail below, computing device 302 can be virtually any type of stationary or mobile computing device (as discussed in more detail below in reference to device 101 in FIG. 1), for example, a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

Upon Bob visiting the Flickr® site, he desires to view his photo-collection hosted by the site. In order to do so, he needs to "login," which requires authentication by server 304, which involves the authentication procedure discussed herein. In order to start the process, for example, he clicks the sign-in button. In some embodiments, upon a user visiting a page or site of a web-based resource, or opening an application associated with a web-based resource, the authentication process discussed herein will automatically begin, which is based upon an automatic detection that a user desires to access secure content and the user needs to be authenticated (or identified or verified).

An example initial stage of the authentication process can be requesting the user to enter his username. Upon satisfaction that the username is correct, the user can then be prompted to enter his password. In another example, after the username is entered and verified, the user can be subject to the electronic phone verification mechanism. In yet another example, after the user correctly enters his username and password, the authentication process can determine to skip a particular verifier, such as a phone verification mechanism, because of the identified characteristics surrounding the user's login—e.g., the user is determined to be at a physical geographic location that has low network connectivity; therefore, based on the high costs and low reliance on the user receiving an SMS message, it is determined that the more secure and reliable approach in confirming the user's identity involves presenting the user with a CAPTCHA, or a series of them to ensure they are who they say they are, and that the user is not a malicious bot, as discussed above. Each of these stages and/or mechanisms provided to the user provides the user with opportunities to correctly relay information identifying himself. Such mechanisms, and how they are tied to states, and lead to subsequent transitions, will be discussed in more detail below with reference to FIGS. 5-6.

Continuing with the example from FIG. 3, upon Bob entering his username, the computing device communicates (e.g., forwards/sends) the username to server 304 that hosts the account information for Flickr®. The Yahoo!® server determines that the username is correct and instead of normally asking for a password, since user Bob's account has recently been subject to an anti-spoofing attempt (within a threshold period of days), server 304 sends a message (i.e., a push message) to Bob's mobile device 306. Bob's mobile device 306 has been previously linked/registered to his Flickr® (or Yahoo!®) account and therefore is "trusted." Mobile device 306 can be virtually any type of personal user device (as discussed in more detail below in reference to devices 102-104 in FIG. 1).

The push message from server 304 to mobile device 306 prompts Bob to authenticate himself via the standard means for authenticating himself on the device 306. According to some embodiments, the push message can be linked to an associated application (or program) running on Bob's device 306. For example, if Bob has a Flickr® application installed on his device 306, then the push message is sent from server 304 to Bob's device 306 with the intent of triggering and activating the Flickr® application to provide the prompt to Bob. In another example, Bob may have a dedicated authentication application installed on his device 306 that has the sole purpose of receiving such push messages and performing local device authentication, or the device might be configured to receive push messages on a home or lock screen, for example in a manner used on iOS® and Android® devices.

The prompt requests Bob to authenticate himself. In some embodiments, Bob can authenticate himself by reusing the means of authentication that exits on his device 306. For example, Bob can enter device 306's PIN code or biometric information (e.g., fingerprint=TouchID™). Thus, Bob can authenticate himself to Flickr® through a login (or "unlock") procedure that is already known and trusted by Bob's device 306 and by Bob.

In response to Bob entering his PIN code, for example, Bob's device 306 (or the Flickr® application installed/running on Bob's device 306) responds to the push message by sending the outcome of the authentication to the server 304. If the authentication from Bob was successful (or approved), the server 304 then can either authenticate Bob and permit entry to the web-based resource, or can provide another verification mechanism (which, as discussed above, and in more detail below, can be based on attributes, characteristics or other data/metadata associated with the timing, how and from where Bob's response originated).

According to some embodiments, for example, instead of the server 304 sending a push message to the user prompting the user to enter "login" credentials native to the mobile device 306, the server 304 can generate a unique/one-time, random code (or numerical/character string) and send the code to the client device. In some embodiments, such unique code can, instead of replacing the push message discussed above, follow the push message discussed above such that Bob must perform two-sequential push message verifications. The code can be sent as a standard communication message, such as an email, SMS, MMS, and the like, or can be sent as a push notification to the user's device 306. The user can then enter the code received at his/her device 306 in a form displayed on the computing device 302 (which is enabled via a prompt displayed on the login screen in accordance with the username prompt, or as a result of the username of the user being entered and confirmed by the server 304). The browser/application running on device 302 then sends the code to the server 304 for authentication/ confirmation. Such embodiment of entering a code received at a mobile device 306 in a web-based form presented on device 302 is represented by the "dotted-line" in FIG. 3 connecting device 302 and 306.

In some embodiments, after the username, password and push message notification, the system can log Bob into the web-based resource, or can provide him with another verification mechanism/stage within the authentication process. As mentioned above, and in more detail below, the creation, providing or otherwise communication of such mechanisms are tied to states of a FSM, where transitions between each state, and determinations of subsequent states following satisfied states are dynamically determined and dependent on the information provided by a user/device from a previous state. As discussed herein, which verification states, what order they are provide to a user, as well as how many states are provided to a user are dependent on information associated with the user's identity, location, response, and the like, and can include data and metadata derived, determined, or otherwise identified from, but not limited to, network characteristics, device characteristics, user behavior, user demographics, user location, time of request, a type of web-based resource, and the like, or some combination thereof.

According to some embodiments of the present disclosure, all communication occurring between device 302, server 304 and device 306 can be encrypted in order to avoid the possibility of unwanted access, alteration or corruption of user account and login information, but such encryption is not mandatory. That is, for security of the information contained within communicated messages during the login/ authorization systems and methods discussed herein and for security of information associated with users of such web-based resources, messages may be secured by using any known or to be known negotiated encryption key or a pre-defined encryption key. Such encryption may occur at a sending device, receiving device and/or communicating server(s), or some combination thereof.

As discussed in more detail below, with reference to FIG. 7, according to some embodiments, information associated with or derived from the web-based resource the user is requesting access to, as discussed herein, can be used for monetization purposes and targeted advertising when providing access to such systems or platforms. That is, providing targeted advertising to users associated with the systems they are requesting access to and/or or being granted access to can lead to an increased click-through rate (CTR) of such ads and/or an increase in the advertiser's return on investment (ROI) for serving such content provided by third parties (e.g., advertisement content provided by an advertiser, where the advertiser can be a third party advertiser, or an entity directly associated with or hosting the systems and methods discussed herein).

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102 and client device 101. FIG. 1 additionally includes a variety of servers, such as content server 106, application (or "App") server 108, search server 120 and advertising ("ad") server 130.

One embodiment of mobile devices 102-104 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and an HD display in which both text and graphics may be displayed.

A web-enabled mobile device may include a browser application that is configured to receive and to send web-based messages, and the like. The browser application may be configured to receive and display messages which include graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like of the message. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier.

In some embodiments, mobile devices 102-104 may also communicate with non-mobile client devices, such as client device 101, or the like. In one embodiment, such communications may include sending and/or receiving messages, searching for, viewing and/or sharing photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-104 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102 and its components with network 105. Wireless network 110 may include any of a variety of wireless sub-networks that may further overlay stand-alone ad-hoc networks, and the like, to provide an infrastructure-oriented connection for mobile devices 102. Such sub-networks may include mesh networks, Wireless LAN (WLAN) networks, cellular networks, and the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Network 105 is configured to couple content server 106, application server 108, or the like, with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, and the like that may route the signal packet in accordance with a target address and availability of a network path to the target address.

According to some embodiments, the present disclosure may also be utilized within or accessible to an electronic social networking site. A social network refers generally to an electronic network of individuals, such as, but not limited to, acquaintances, friends, family, colleagues, or co-workers, that are coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, phablets, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site, such as an email platform or social networking site, or a personal user site (such as a blog, vlog, online dating site, and the like). A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, search services, email services, photo services, web services, third-party services, audio services, video services, instant messaging (IM) services, SMS services, MMS services, FTP services, voice over IP (VOIP) services, or the like. Such services, for example a search engine and/or search platform, can be provided via the search server 120, whereby a user is able to utilize such service upon the user being authenticated, verified or identified by the service. Examples of content may include images, text, audio, video, or the like, which may be processed in the form of physical signals, such as electrical signals, for example, or may be stored in memory, as physical states, for example.

An ad server 130 comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo!®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108, 120 and 130 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 108, 120 and/or 130. This may include in a non-limiting example, authentication servers, search servers, email servers, social networking services servers, SMS servers, IM servers, MMS servers, exchange servers, photo-sharing services servers, and travel services servers, via the network 105 using their various devices 101-104. In some embodiments, applications, such as a search application (e.g., Yahoo! Search®, and the like), can be hosted by the application server 108 (or search server 120). Thus, the application server 108 can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108, 120 and/or 130 may be integrated into a single computing device, without departing from the scope of the present disclosure.

Figure 2:
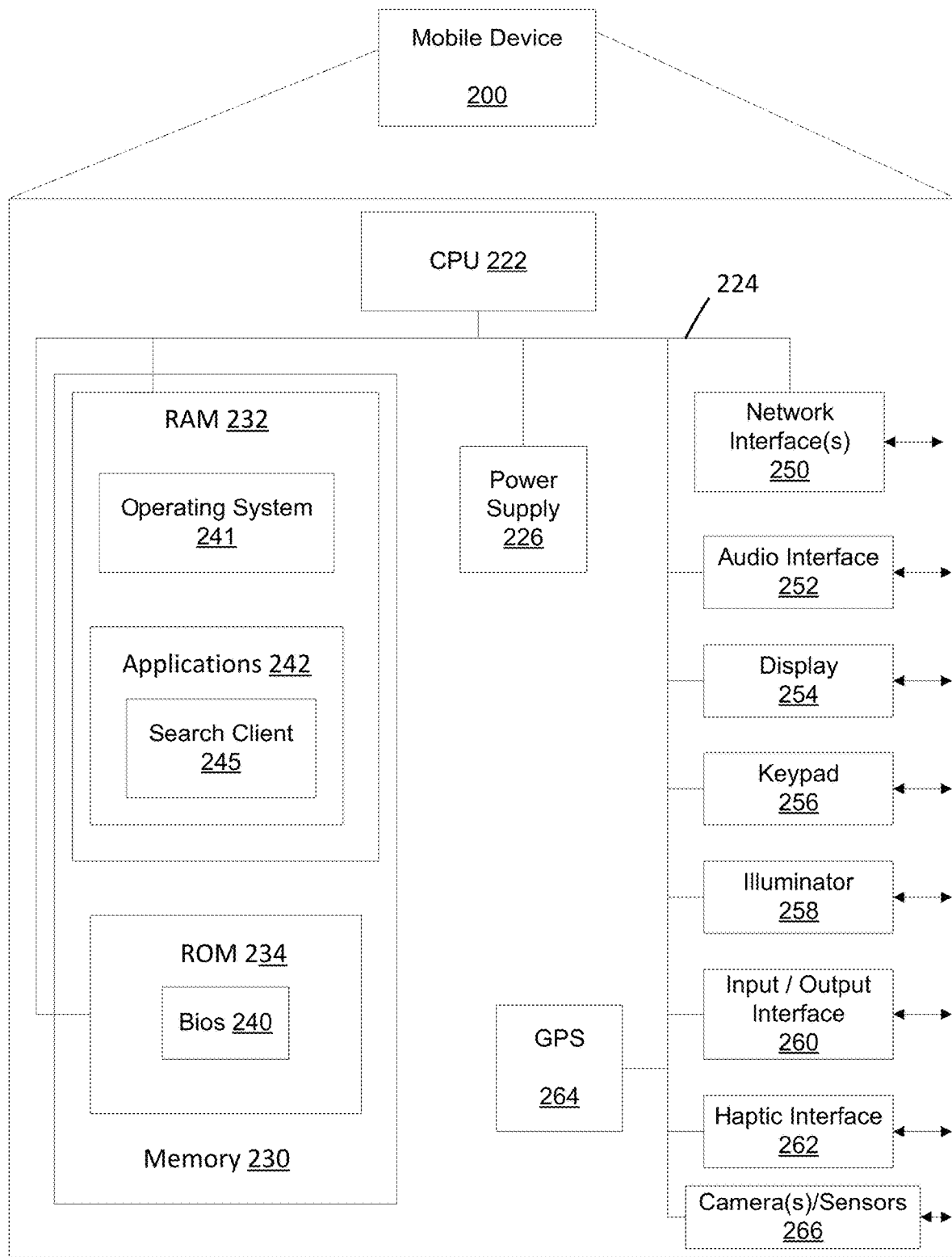
FIG. 2 depicts is a schematic diagram illustrating a client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical or electromagnetic sensors 266. Device 200 can include one camera 266, or a plurality of cameras/sensors 266, as understood by those of skill in the art. The positioning of the camera(s)/sensor(s) 266 on device 200 can change per device 200 model, per device 200 capabilities, and the like, or some combination thereof.

Power supply 226 provides power to Client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies including, but not limited to, global system for Client communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the Client device 200 receives a communication from another user.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of Client device 200 on the surface of the Earth. It is understood that under different conditions, GPS transceiver 264 can determine a physical location within millimeters for Client device 200; and in other cases, the determined physical location may be less precise, such as within a meter or significantly greater distances. In one embodiment, however, Client device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by Client device 200 to store, among other things, applications 242 and/or other data. For example, data stores may be employed to store information that describes various capabilities of Client device 200. The information may then be provided to another device based on any of a variety of events, including being sent as part of a header during a communication, sent upon request, or the like. At least a portion of the capability information may also be stored on a disk drive or other storage medium (not shown) within Client device 300.

Applications 242 may include computer executable instructions which, when executed by Client device 200, transmit, receive, and/or otherwise process audio, video, images, and enable telecommunication with another user of another client device. Other examples of application programs include calendars, browsers, contact managers, task managers, transcoders, database programs, word processing programs, security applications, spreadsheet programs, games, search programs, and so forth. Applications 242 may further include search client 245 that is configured to send, to receive, and/or to otherwise process a search query and/or search result using any known or to be known communication protocols. Although a single search client 245 is illustrated it should be clear that multiple search clients may be employed. For example, one search client may be configured to enter a search query messages, where another search client manages search results, and yet another search client is configured to manage serving advertisements, IMs, emails, and other types of known messages, or the like.

Having described the components of the general architecture employed within the disclosed systems and methods, the components' general operation with respect to the disclosed systems and methods will now be described.

Figure 4:
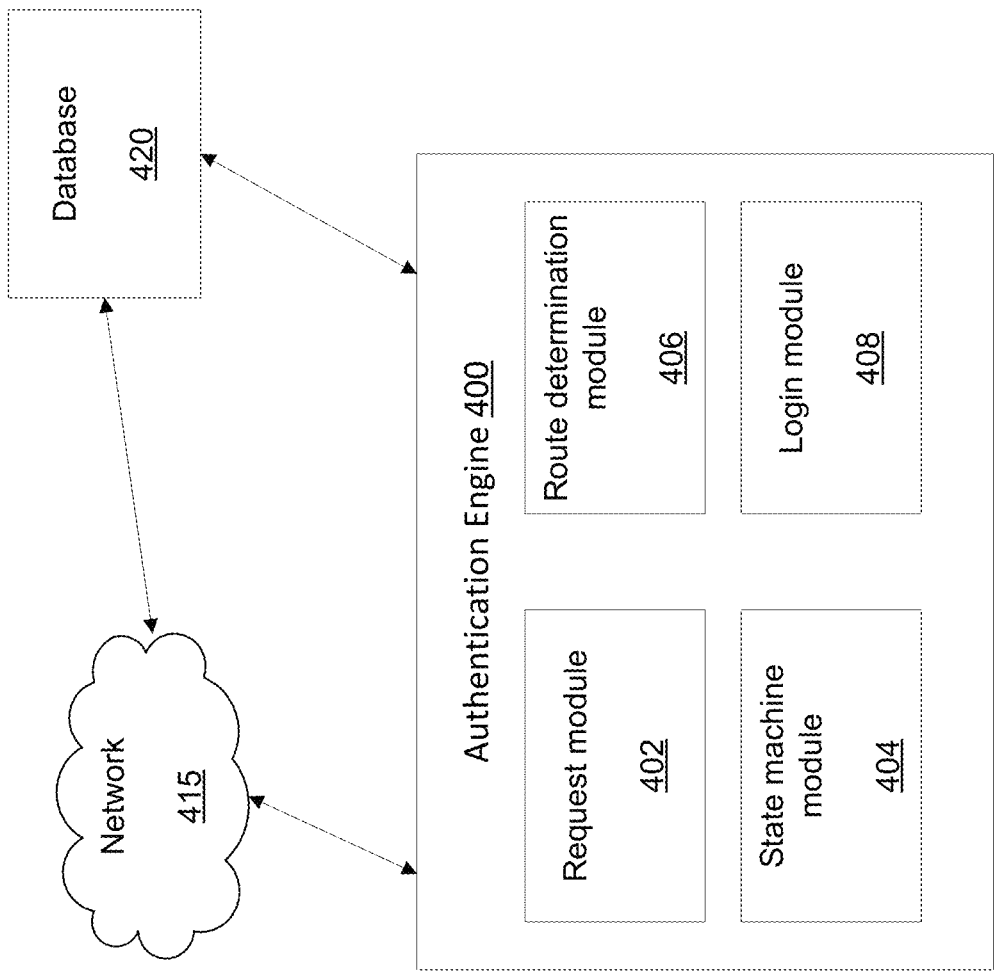
FIG. 4 is a schematic block diagram illustrating components of a system in accordance with some embodiments of the present disclosure.

FIG. 4 is a block diagram illustrating the components for performing the systems and methods discussed herein. FIG. 4 includes a authentication engine 400, network, 415 and database 420. The authentication engine 400 can be a special purpose machine or processor and could be hosted by an application server, web server, search server, content provider, email service provider, ad server, user's computing device, and the like, or any combination thereof. The database 420 can be any type of database or memory, and can be associated with a server on a network which is providing the platform the user is requesting access (e.g., content server 106 or application server 108 from FIG. 1; or server 304 from FIG. 3, for example).

According to some embodiments, authentication engine 400 can be embodied as a stand-alone application that executes on a user device or a server device. In some embodiments, the authentication engine 400 can function as an application installed on the user's device, and in some embodiments, such application can be a web-based application accessed by the user device over a network. In some embodiments, the authentication engine 400 can be installed as an augmenting script, plug-in, program or application to another media application (e.g., Yahoo! Mail®, Yahoo! Video®, Hulu®, Facebook®, Microsoft Outlook® or any other type of known or to be known application or programmed device that requires authentication prior to access being granted).

The database 420 can be any type of database or memory, and can be associated with a content server on a network (e.g., content server 106, search server 120 or application server 108 from FIG. 1) or a user's device (e.g., device 101-104 or device 200 from FIGS. 1-2). Database 420 comprises a dataset of data and metadata associated with local and/or network information related to users, services, applications, content and the like. Such information can be stored and indexed in the database 420 independently and/or as a linked or associated dataset. As discussed above, it should be understood that the data (and metadata) in the database 420 can be any type of information and type, whether known or to be known, without departing from the scope of the present disclosure.

The database 420 comprises a dataset of information associated with login credentials for web-based resources (e.g., FSM data and metadata requesting/providing required credentials for each transition stage/state, and data/metadata associated with each determined/created FSM transition stage/state) and information associated with user and other types of computing devices. The login credential information can include, but is not limited to, a user's profile information, a username, password, demographic information, location information, biographic information, and the like, or some combination thereof. The device information can include, but is not limited to, the device's owner information, voice/data carrier information, "unlocking" credentials (for example, PIN or TouchID™), IP address, and/or any other type of information to identify, confirm and/or authenticate a device, or some combination thereof. In some embodiments, the login credential information and device information, per user, can be stored in database 420 as a linked dataset. It should be understood that the data (and metadata) in the database 420 can be any type of user and/or device information and type, whether known or to be known, without departing from the scope of the present disclosure.

According to some embodiments, as the information stored in database 420, as discussed above, can be stored and indexed as a n-dimensional vector (or feature vector) representation for each dataset, where the information associated with the data and metadata of user, device and/or login information can be translated as a node on the n-dimensional vector. In some embodiments, as login information (e.g., FSM transition state information, login requests and/or entered credentials), as well as tracked, determined or otherwise identified user information is identified, detected and/or created, it can also be stored in the database 420 in a similar manner. Database 420 can store and index such information in database 420 as linked set of data and metadata, where the data and metadata relationship can be stored as the n-dimensional vector. Such storage can be realized through any known or to be known vector or array storage, including but not limited to, a hash tree, queue, stack, VList, or any other type of known or to be known dynamic memory allocation technique or technology. It should be understood that any known or to be known computational analysis technique or algorithm, such as, but not limited to, vector analysis, cluster analysis, data mining, Bayesian network analysis, Hidden Markov models, artificial neural network analysis, logical model and/or tree analysis, and the like can be used for identifying, storing and indexing (and searching for) the user, device and/or login information in database 420.

As discussed above, with reference to FIG. 1, the network 415 can be any type of network such as, but not limited to, a wireless network, a local area network (LAN), wide area network (WAN), the Internet, or a combination thereof. The network 415 facilitates connectivity of the authentication engine 400, and the database of stored resources 420. Indeed, as illustrated in FIG. 4, the authentication engine 400 and database 420 can be directly connected by any known or to be known method of connecting and/or enabling communication between such devices and resources.

The principal processor, server, or combination of devices that comprises hardware programmed in accordance with the special purpose functions herein, referred to for convenience as authentication engine 400, includes a request module 402, state machine module 404, route determination module 406 and login module 408. It should be understood that the engine(s) and modules discussed herein are non-exhaustive, as additional or fewer engines and/or modules may be applicable to the embodiments of the systems and methods discussed. The operations, configurations and functionalities of each module, and their role within embodiments of the present disclosure will be discussed below.

Figure 5:
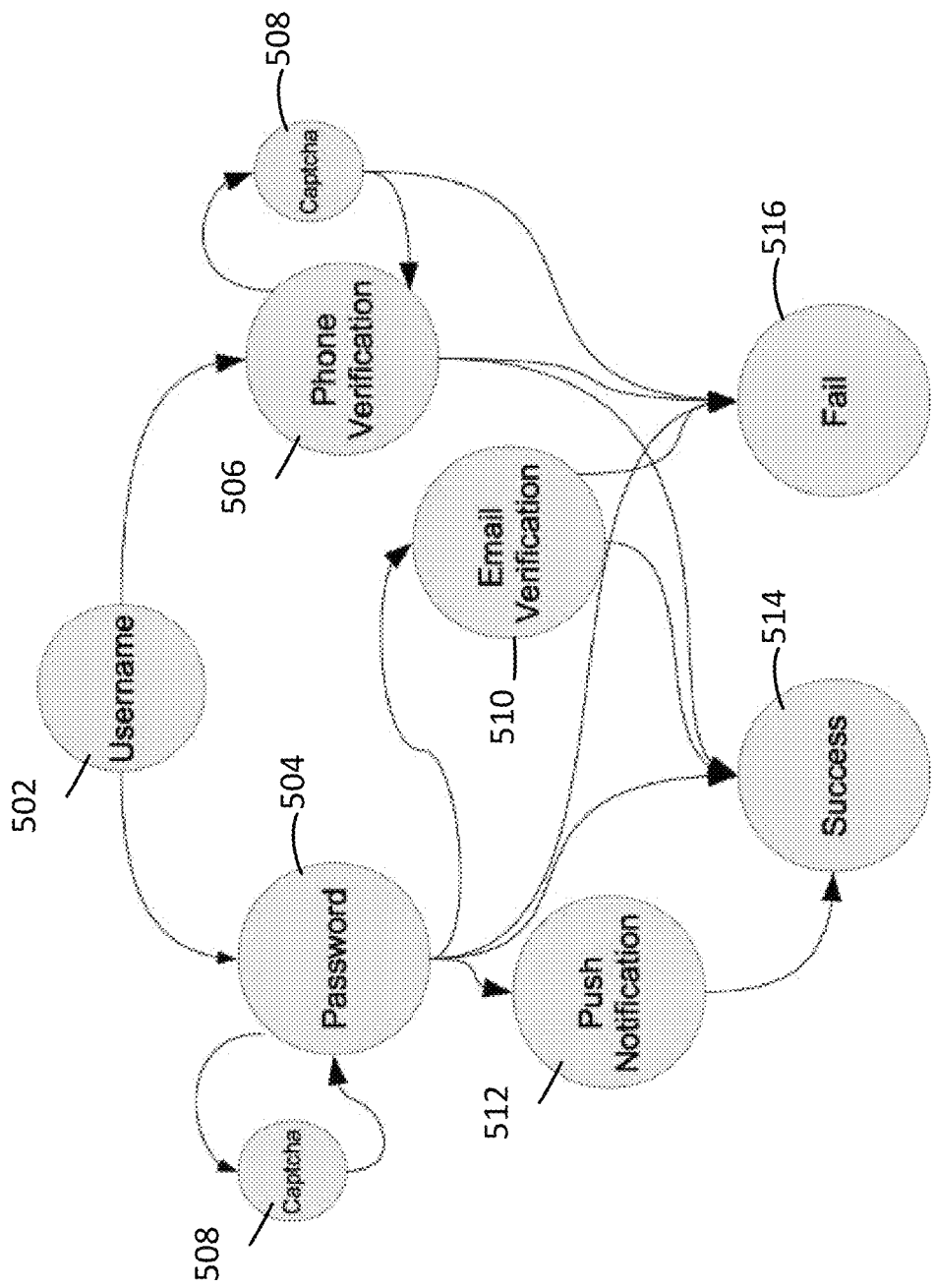
FIG. 5 depicts a non-limiting flow diagram example of transition states within an example state machine in accordance with some embodiments of the present disclosure.

FIG. 5 depicts an example flow 500 of a number of transition states within an applied state machine in accordance with some embodiments of the instant disclosure. It should be understood that the example depicted in relation to the flow 500 applied by a state machine implemented by the authentication engine 400 is non-limiting in nature, as any number or variation of routes, transitions and/or stages can be implemented within the flow 500 without departing from the scope of the instant application. Indeed, as discussed herein, user responses, and the information (data and metadata) associated with such responses, dictate the route/path upon which the state machine's states are traversed.

According to some embodiments, as discussed above, the state machine implementing flow 500 can be configured with a set of states (e.g., a single or plurality of states/stages), such that in order to transition from one state to the next, that state (e.g., the current state of the FSM) must be satisfied. For example, the states of a FSM can be configured to request information based upon information related to, but not limited to, username/password, a pin code or other character sequence (e.g., a PIN), a character sequence or other type of log-in credential entry set by the user, platform or service, system administrator or device for accessing the user device, out-of-band communications (e.g., phone verification, SMS verification, email verification), biometrics (e.g., fingerprints, iris scan, facial recognition, voice recognition, or other biometrics), push notifications, and the like. As discussed above, the states of the state machine (e.g., what order they are provided to a user, which states are provided, as well as how many states are provided to a user) are dependent on information associated with the user's identity, location, response, and the like, and can include data and metadata derived, determined, or otherwise identified from, but not limited to, network characteristics, device characteristics, user behavior, user demographics, user location, time of request, a type of web-based resource, and the like, or some combination thereof.

As illustrated in FIG. 5, the example flow 500 includes states 502-516. State 502 requests the user provide his/her username associated with a web-based resource. State 504 requests the user enter his/her password. States 508 provide a CAPTCHA that requests the user enter the requested information in response to the provided CATCHA. State 506 involves an out-of-band communication associated with any type of known or to be known phone verification. State 510 involves an out-of-band communication associated with any type of known or to be known email verification. Step 512 corresponds to any type of known or to be known push notification message that involves a user receiving a push message and responding in an appropriate manner by providing the pushed information in response to the notification. Steps 514 and 516 correspond to a determination regarding whether the user is granted access to the web-based resource: Step 514—logging the user into his/her account; Step 516—providing an indication that the user's login attempt has been denied.

In order to simplify the discussion of FIG. 5, an example will be discussed in order to clearly and concisely describe how a state machine/FSM proceeds from Step 502 to Step 514 or Step 516.

For example, a user clicks on the "sign-in" button displayed on a web-based resource login page by using the browser on her laptop. The first state (e.g., for most users), is the username state—Step 502. The user cannot exit this state until she provides a valid username (e.g., user identifier (ID)) that is associated with the user's account for the web-based resource (e.g., the ID stored in database 420). For example, the user enters her user ID and in response, the authentication engine 400 checks whether this matches the username stored in database 420.

Continuing with the example, if the user enters a proper user ID, the FSM (via the authentication engine 300) determines that the next state is for the user to enter her password that is associated with the username—Step 504. In an example, this determination can be based on information indicating that the user entered her username correctly on the first attempt, or in another example, entered the username without having to correct any key that was entered (e.g., using the backspace or delete key to correct an incorrectly entered character). This information can be provided as part of the username data, or can be identified by monitoring the activity of the user while she is entering the username.

Having determined that the next state is the password state 504, the FSM transitions from state 502 to (now current state) state 504, such that the user can only exit this state (or transition to another state—States 506-516) via three ways. The first way is correctly providing a valid password that matches the username (as stored in database 420). The second way is to provide an invalid password; and the third is by indicating that she forgot her password.

As an example, the user has forgotten her password. The FSM then queries the database and determines that the user has a device (e.g., smartphone) registered already with the service provider associated with the web-based resource. This information can be stored as information associated with the user's profile in database 420. The registering of the device provides an indication to the authentication engine 400 executing the FSM that the user can receive push notifications. Thus, based on this determination, the password state 504 is exited and the FSM transitions to a push verification state (e.g., Step 508).

In a push verification state, the user can receive a push notification on the identified device (which has been previously registered and/or identified as a "trusted" device, as understood by those of skill in the art). Here, the authentication engine 400 can choose to show a CAPTCHA (as in State 508) to the user. If the CAPTCA is solved, the authentication engine 400 can chose to show another CAPTCHA (in order to defy automated software or a malicious hack attempt) or send another push notification to the user, as in Step 512. If the user accepts the push notification, and responds appropriately, she can then be determined to "be who she says she is" and the FSM transitions to the success state—Step 514. In such state, for example, as understood by those of skill in the art, Step 514 can involve issuing cookies to the device the user is using to log-in to the web-based resource which occurs when the user is logged into her account associated with the web-based resource. If the user refuses or fails the push notification in Step 512, the user can be placed into the fail state—Step 516, where she is shown an error page indicating that her attempt to login has failed.

As illustrated in FIG. 5, each item corresponds to a state/stage of the FSM that is implemented by the authentication engine 400, and authentication of a user can be fairly complex and have various possible permutations and combinations. Modeling the flow 500 as a state machine allows each state to be easily configurable. For example, if SMSs messages are expensive (as in Step 506), then the authentication engine 400 can simply remove the transitions that lead to the phone verification state (Step 506), or can add more CAPTCHAs (Steps 508) so that malicious actors are discouraged from triggering SMSs to users. The authentication engine 400's usage of a FSM enables the automatic and dynamic determination of alternative states and routes during a user's login process, which without a state machine, would involve engineers having to manually change the flow in the code of a login process for each web-based resource, which is a time consuming, cost-ineffective and error prone process. Usage of a state machine further enables the authentication engine 400 to perform computerized dynamic analysis of the configuration of the authentication process for a web-based resource to ensure that all possible flows that lead to success meet a certain basic level of security. In some embodiments, the authentication engine 400 can implement diagnostic tests in order to ensure that users do not get stuck in infinite loops (or deadlocks) that prevent them from logging in to the resource.

Figure 6:
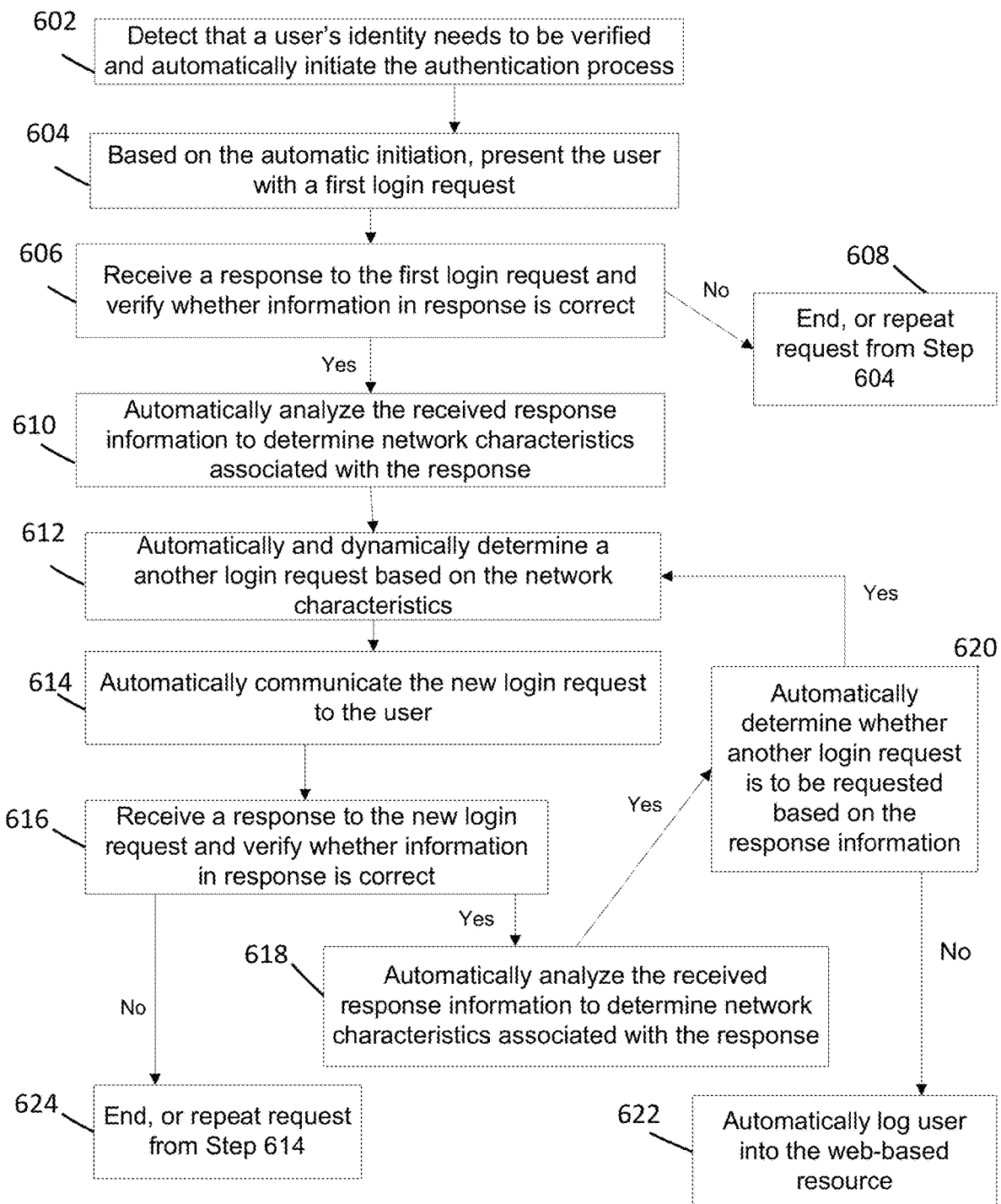
FIG. 6 is a flowchart illustrating steps performed in accordance with some embodiments of the present disclosure.

Turning to FIG. 6, Process 600 details steps performed in accordance with some embodiments for authenticating users on a network based on a dynamically determined combination of credentials requested by a state machine provided by authentication engine 400. Steps 602, 604 and 614 are performed by the request module 402 of the authentication engine 400, Steps 606-610, 616, 618, 624 are performed by the state machine module 404, Steps 612 and 620 are performed by the route determination module 406, and Step 622 is performed by the login module 408.

Process 600 is modeled as an authentication flow based upon a FSM configured with a variety (e.g., plurality) of mechanisms for authentication, where each is electronically tied to various states within the FSM. When coupled to a device, system, service or platform, the FSM enables a dynamically determined authentication flow to be presented to the user, such that in order for the user to gain entry to the requested device, platform or service, the user must efficiently and accurately provide the requested credentials at each transition stage (or state) of the FSM, where each transition stage corresponds to an independent authentication mechanism. As discussed above, in some embodiments, the requested credentials for a transition stage can be determined and presented to a user based on information derived or associated with a user, which can include, but is not limited to, the identity of the user, the previously entered credential by the user (from a previous state), the manner in which such credential was entered, and the like, or some combination thereof, as discussed in more detail below.

Process 600 begins with Step 602 where the authentication process of 600 is initiated. Such initiation is based on a detection that the user's identity needs to be verified. As discussed above in relation to FIG. 5, for example, such detection can be based on a user attempting to sign-in to a web-based resource, a user opening an application, or visiting a web page.

In Step 604, a first state of the FSM is identified and is presented to the user. As discussed above in relation to FIG. 5, this involves presenting the user with a first login request. For example, with reference to FIG. 5, the first login request can be a displayed dialog box, text box or window requesting the user enter his/her username (as in Step 502 of flow 500).

According to some embodiments, the identification of the first state (or login request) provided to the user can be automatically determined based on a variety of factors including, but not limited to, network characteristics, device characteristics, user information and/or behavior, an identity or type of web-based resource, and the like, or some combination thereof. This information can be derived, determined or otherwise identified by analyzing the detected information from Step 602 and determining that the first login state is the appropriate state to present to the user. Such analysis and/or detection can be based on any known or to be known computational analysis technique or algorithm, such as, but not limited to, vector analysis, cluster analysis, data mining, Bayesian network analysis, Hidden Markov models, and artificial neural network analysis. In some embodiments, the first state of the FSM presented to a user may be a predetermined state (while the other states are dynamically determined based on the user's response to the first state and subsequently provided states).

In Step 606, a response to the first login request is received and is analyzed in order to determine whether the response is correct (e.g., determine authenticity of the response). As discussed above, this can involve parsing the response to identify and verify the information within the response using any of the known or to be known computational analysis techniques discussed above to compare the received response to information stored in database 420. For example, as discussed in relation to FIG. 5, the supplied username or user ID provided by the user is verified as matching the username/ID stored in database 420.

If the supplied response to the first login request is determined to be incorrect (or not match the information stored in database 420), Process 600 can proceed to Step 608, where Step 604 can be repeated, or a login-fail screen can be provided to the user—as discussed above in relation to the discussion of Step 516 in flow 500.

If the supplied response received in Step 606 is confirmed accurate, then Process 600 can proceed to Steps 610-612, where another state of the FSM is determined which can further ensure the user's identity. In some embodiments, the states of authentication engine 400's applied FSM are dynamically determined such that the next login request is based upon data analytics associated with the user's response. Therefore, in Step 610, the authentication engine 400 analyzes, using any of the known or to be known computational analysis techniques discussed above, the data (and/or metadata) associated with the user's response, which can include, but is not limited to, network characteristics, device characteristics, user information and/or behavior, an identity or type of web-based resource, and the like, or some combination thereof. This information can be leveraged in order to determine the next login request that is to be provided to the user, as in Step 612.

In some embodiments, in Step 612, the data/metadata of a user's response is analyzed and compared against a threshold for the type of information for which it corresponds. If the data/metadata does not satisfy the threshold, or falls within a predetermined range of such threshold, then another type of login request can be identified, as discussed herein. Such analysis and threshold comparisons are performed via the discussed above any type of known or to be known computational analysis techniques.

For example, after requesting a user enter her username, the user may be presented with a phone verification because the device used to provide the username is an unrecognized device. Therefore, according to Steps 610-612, an email verification request may be sent to the user's email account associated with the web-based resource (e.g., as identified from the user information stored in database 420). In another example, if the user accesses his/her email account in response to the provided email verification request on a device that is unregistered, then the user may be provided with yet another verification request, as discussed in more detail below in relation to Step 620.

In some alternative embodiments, Process 600 is based upon a predetermined FSM state diagram such that the login requests for each of the states of the state machine applied by the authentication engine 400 are previously mapped out for each web-based resource. Therefore, in such embodiments, Step 610 may be skipped such that after receiving and confirming the correct response to the first login request, as in Step 606, Process 600 can proceed directly to Step 612 in order to identify the next state of the FSM—the next login request to provide to the user.

In Step 614, the determined login request from Step 612 is automatically communicated to the user. In Step 616, the response to the request in Step 614 provided by the user is received and is analyzed to determine its authenticity or accuracy—performed in a similar manner as discussed above in relation to Step 606.

If the supplied response to the request from Step 614 is determined to be incorrect, Process 600 can proceed to Step 624, where Step 614 can be repeated, or a login-fail screen can be provided to the user—which can be performed in a similar manner as discussed above in relation to Step 608.

If the supplied response received in Step 616 is confirmed accurate, then Process 600 can proceed to Steps 618-620. In a similar manner as discussed above in relation to Steps 610-612, in Step 618 the authentication engine 400 analyzes, using any of the known or to be known computational analysis techniques discussed above, the data (and/or metadata) associated with the user's response received in Step 616. Based on the identified information from such analysis, Step 620 involves determining whether another login request is to be requested. If the user's identity is determined to require further testing based on the analysis occurring in Step 620, then Process 600 proceeds back to Step 612 where another login request is formulated and communicated to the user (as in Step 614). If, however, the user's identity is confirmed, based on analysis of the user's response in Step 616 (or responses, collectively received in Steps 606 and 616), and the determined network characteristics associated with such response(s), then Process 600 can proceed to Step 622, where the user is automatically logged into his/her account associated with the web-based resource (e.g., Step 514 of flow 500, as discussed above).

According to some embodiments, Process 600 can result in the same user engaging in different login flows based on not only their intended destination, but also based on their responses to the login requests. For example, if a user's response to a CAPTCHA request is only verified after the user "recycles" the CAPTCHA a threshold satisfying number of times, or tries and fails a threshold number of times before properly entering the requested entry in the CAPTCHA, then a next login request may be different had the user entered the proper CAPTCHA on the first try. In another non-limiting example, if one state of the FSM requests facial recognition of the user, and the user satisfies the facial recognition test, but at a level that indicates there may be a chance/probability of spoofing, another facial recognition test or other type of biometric test may be used in a subsequent state rather than providing the user with a password request or simply logging them in. For example, if the pixels in the facial recognition response provided by the user are at a level that indicates it may not be associated with an actual human's face (and rather is associated with a digital representation of the human's face being captured by the camera on the user's device—e.g., taking a picture of a picture), then another biometric test (e.g., voice recognition) may be provided in the next state because there was an indication that the previous response may be a malicious attempt to access a user's account.

Figure 7:
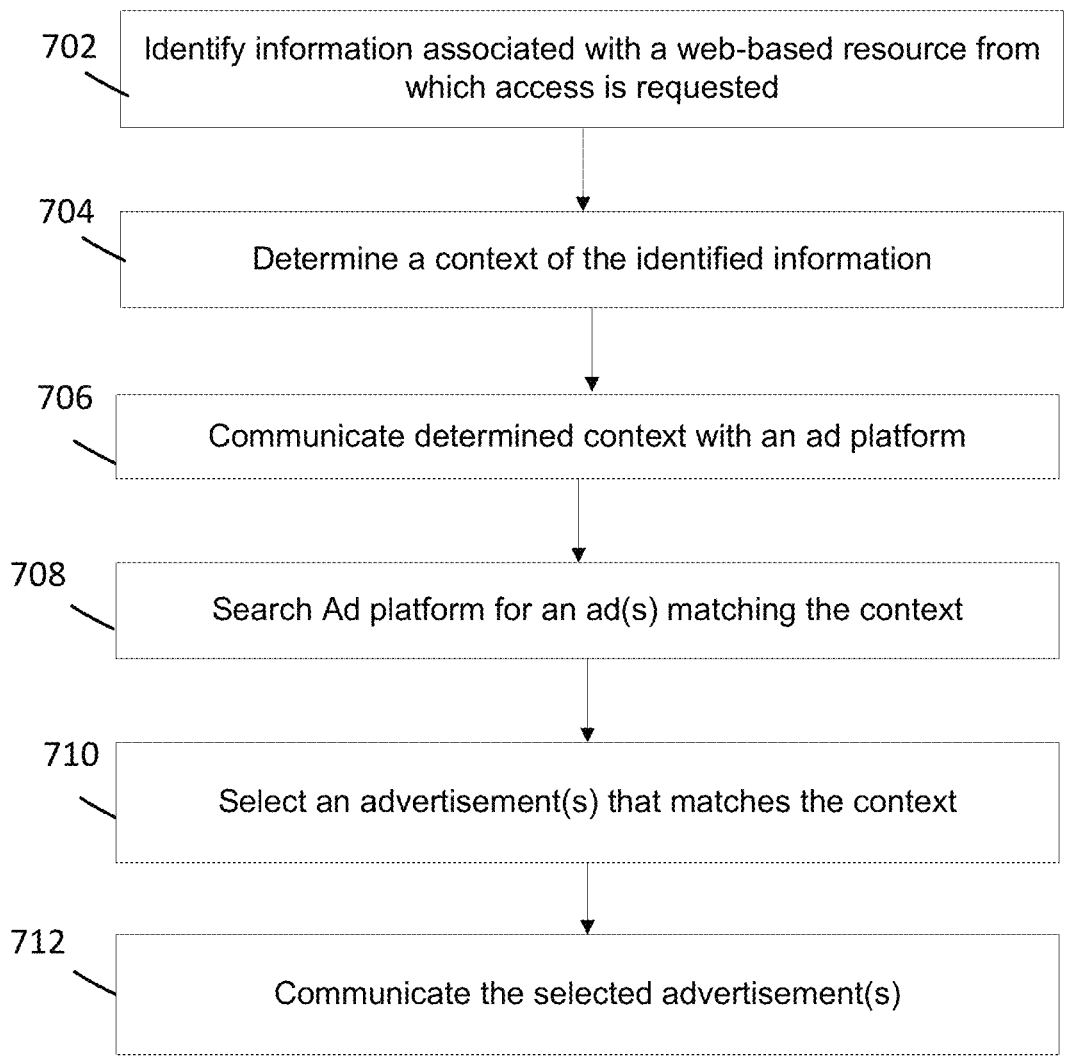
FIG. 7 is a flowchart illustrating steps performed in accordance with some embodiments of the present disclosure.

FIG. 7 is a work flow example 700 for serving relevant digital content associated with advertisements (e.g., advertisement content) based on the content of the web-based platform/service the user is requesting access to or has gained access to, as discussed above. Such information, referred to as "web-based resource information" for reference purposes only, can include, but is not limited to, the content in a media file, web page, device or platform, an identity of the requesting user and/or device being utilized by the user, the identity and/or type of the application being used to request access or associated with the web-based resource, information associated with the time, location and/or other real-world data for when access is requested, and the like, and/or some combination thereof.

As discussed herein, reference to an "advertisement" should be understood to include, but not be limited to, digital content that provides information provided by another user, service, third party, entity, and the like. Such digital ad content can include any type of media renderable by a computing device, including, but not limited to, video, text, audio, images, and/or any other type of known or to be known multi-media. In some embodiments, the digital ad content can be formatted as hyperlinked multi-media content that provides deep-linking features and/or capabilities.

For example, if a user is being authenticated for a web-based credit card system in order to access the credit card's hotel listing page, upon the user being granted access to the page, the user can be presented with advertisements for discounted hotel deals or rebates for vacation packages at the hotel.

In Step 702, information associated with a web-based resource is identified. For purposes of this disclosure, Process 700 will be discussed using a single web-based resource as the basis for serving an advertisement(s); however, it should not be construed as limiting, as any number of web-based resources, or types of resources, can form the basis for serving ads without departing from the scope of the instant disclosure.

In Step 704, a context is determined based on the identified web-based resource information. This context forms a basis for serving advertisements related to the web-based resource. In some embodiments, the context can be determined by determining a category which the web-based resource information of Step 702 represents. For example, the category can be related to the content type of the content hosted by the web-based resource. In some embodiments, the identification of the context from Step 704 can occur before, during and/or after access is granted (or denied) for the web-based resource, or some combination thereof. That is, in some embodiments, the identification of the context from Step 702 may occur during the login/authentication procedure, or after the login/authentication procedure discussed above with reference to FIGS. 3-6, or some combination thereof.

In Step 706, the context (e.g., content/context data) is communicated (or shared) with an advertisement platform comprising an advertisement server 130 and ad database. Upon receipt of the context, the advertisement server 130 performs a search for a relevant advertisement within the associated ad database. The search for an advertisement is based at least on the identified context.

In Step 708, the advertisement server 130 searches the ad database for an advertisement(s) that matches the identified context. In Step 710, an advertisement is selected (or retrieved) based on the results of Step 708. In some embodiments, the selected advertisement can be modified to conform to attributes of the page, file, message, application or method upon which the advertisement will be displayed, and/or to the application and/or device for which it will be displayed. In some embodiments, the selected advertisement is shared or communicated via the application the user is utilizing to access the web-based resource. Step 712. In some embodiments, the selected advertisement is sent directly to each user's computing device. In some embodiments, the selected advertisement is displayed in conjunction with the home screen or logged-in screen being displayed to the user.

Figure 8:
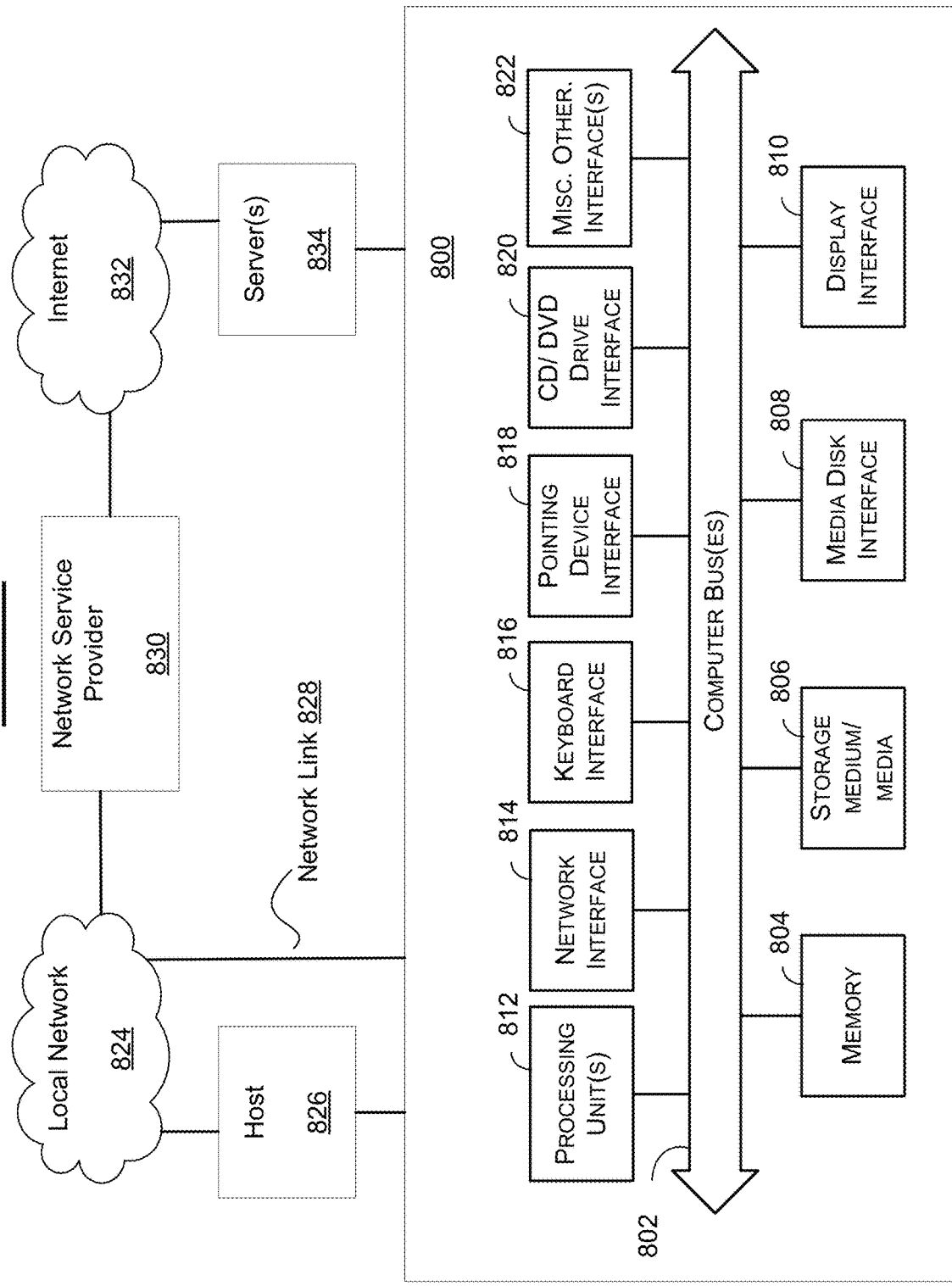
FIG. 8 is a block diagram illustrating architecture of a hardware device in accordance with one or more embodiments of the present disclosure.

As shown in FIG. 8, internal architecture 800 of a computing device(s), computing system, computing platform and the like includes one or more processing units, processors, or processing cores, (also referred to herein as CPUs) 812, which interface with at least one computer bus 802. Also interfacing with computer bus 802 are computer-readable medium, or media, 806, network interface 814, memory 804, e.g., random access memory (RAM), run-time transient memory, read only memory (ROM), media disk drive interface 820 as an interface for a drive that can read and/or write to media including removable media such as floppy, CD-ROM, DVD, media, display interface 810 as interface for a monitor or other display device, keyboard interface 816 as interface for a keyboard, pointing device interface 818 as an interface for a mouse or other pointing device, and miscellaneous other interfaces not shown individually, such as parallel and serial port interfaces and a universal serial bus (USB) interface.

Memory 804 interfaces with computer bus 802 so as to provide information stored in memory 804 to CPU 812 during execution of software programs such as an operating system, application programs, device drivers, and software modules that comprise program code, and/or computer executable process steps, incorporating functionality described herein, e.g., one or more of process flows described herein. CPU 812 first loads computer executable process steps from storage, e.g., memory 804, computer readable storage medium/media 806, removable media drive, and/or other storage device. CPU 812 can then execute the stored process steps in order to execute the loaded computer-executable process steps. Stored data, e.g., data stored by a storage device, can be accessed by CPU 812 during the execution of computer-executable process steps.

Persistent storage, e.g., medium/media 806, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 828 typically provides information communication using transmission media through one or more networks to other devices that use or process the information. For example, network link 828 may provide a connection through local network 824 to a host computer 826 or to equipment operated by a Network or Internet Service Provider (ISP) 830. ISP equipment in turn provides data communication services through the public, worldwide packet-switching communication network of networks now commonly referred to as the Internet 832.

A computer called a server host 834 connected to the Internet 832 hosts a process that provides a service in response to information received over the Internet 832. For example, server host 834 hosts a process that provides information representing video data for presentation at display 810. It is contemplated that the components of system 800 can be deployed in various configurations within other computer systems, e.g., host and server.

At least some embodiments of the present disclosure are related to the use of computer system 800 for implementing some or all of the techniques described herein. According to one embodiment, those techniques are performed by computer system 800 in response to processing unit 812 executing one or more sequences of one or more processor instructions contained in memory 804. Such instructions, also called computer instructions, software and program code, may be read into memory 804 from another computer-readable medium 806 such as storage device or network link. Execution of the sequences of instructions contained in memory 804 causes processing unit 812 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 800. Computer system 800 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 802 as it is received, or may be stored in memory 804 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising steps of:
receiving, at a computing device, an access request from a user to access a secure resource from a first device associated with the user, said computing device controlling access to said secure resource by using a finite state machine (FSM) that is dynamically configured with a first login stage and subsequent login stages, a type and amount of said subsequent login stages being automatically and dynamically determined based on responses to login requests of each previous login stage, each response to each login request at each stage of the FSM comprises information selected from a group consisting of: network data, network activity, device characteristics, user behavior, user location, user identity, and a type of web-based resource;
automatically communicating, via the computing device over a network, a first login request to said user in response to said access request, said first login request associated with said first login stage of the FSM;
receiving, at the computing device, a response to said first login request, said response comprising response information addressing said first login request and response data indicating a response from a first push notification, in which said response information was entered by the user on said first device and communicated to said computing device;
parsing, via the computing device, said response, and identifying said response information and said response data;
analyzing, via the computing device, said response information, and based on said analysis, determining an authenticity of said response based on whether said response information comprises data corresponding to stored information associated with the first login request;
dynamically determining, via the computing device, based on said determined authenticity and said response data, a second login stage of the FSM, said determined second login stage comprising a second login request comprising information generated based on said authenticity, aid second login request being a type of login request that is based on said response data;
automatically communicating, via the computing device over the network, said second login request associated with the dynamically determined second login stage of the FSM to said user;
receiving, at the computing device, a second response to said second login request, said second response comprising response information addressing said second login request and response data indicating a response from a second push notification, in which said second response information was entered by the user on said first device and communicated to said computing device;
analyzing, via the computing device, said second response information, and based on said analysis, determining an authenticity of said second response based on whether said second response information comprises data corresponding to stored information associated with the second login request;
automatically determining, via the computing device, information to communicate to said first device of said user based on said second determined authenticity and said second response data, said information associated with a dynamically determined third stage of said FSM;
automatically communicating, via the computing device over the network, said determined information associated with the dynamically determined third stage to said first device, said communication resulting in said determined information of the third stage being displayed on a display of said first device;
determining, via the computing device a context of the resource;
communicating, over said network, said context to an ad platform, over the network, to obtain an advertisement associated with said context; and
causing communication, over the network, of said identified advertisement to said first device for display in association with said determination of said third stage.

2. The method of claim 1, wherein said information associated with said third stage of the FSM corresponds to a third login request.

3. The method of claim 2, further comprising:
receiving a third response to said third login request, said third response comprising information provided by said user;
automatically analyzing said third response in order to determine an authenticity of said third response information, said analysis comprising parsing said third response and determining whether said third response information corresponds to stored information associated with said third login request, said analysis further comprising parsing said third response information and identifying third network characteristics associated with said third response; and
automatically determining fourth information to communicate to said first device, said fourth information associated with a fourth stage of said FSM, said fourth information is based on said third authenticity and said third network characteristics.

4. The method of claim 1, wherein said information associated with said third stage of the FSM corresponds to a logged-in page associated with said secure resource.

5. The method of claim 1, wherein said authenticity includes an indication that said response information matches the stored first login request information.

6. The method of claim 1, wherein said authenticity of said response indicates that said response information is not correct.

7. The method of claim 6, wherein said second login request comprises a different version of information requested in said first login request.

8. The method of claim 6, further comprising:
communicating, to the first device, an electronic message indicating that said access request has been denied.

9. The method of claim 1, wherein the login requests associated with the login stages of the FSM request information associated with login types selected from a group consisting of: username, password, out-of-band communications, CAPTCHA, biometrics, and hardware tokens.

10. A non-transitory computer-readable storage medium tangibly encoded with computer-executable instructions, that when executed by a processor associated with a computing device, performs a method comprising:
receiving, at the computing device, an access request from a user to access a secure resource from a first device associated with the user, said computing device controlling access to said secure resource by using a finite state machine (FSM) that is dynamically configured with a first login stage and subsequent login stages, a type and amount of said subsequent login stages being automatically and dynamically determined based on responses to login requests of each previous login stage, each response to each login request at each stage of the FSM comprises information selected from a group consisting of: network data, network activity, device characteristics, user behavior, user location, user identity, and a type of web-based resource;

automatically communicating, via the computing device over a network, a first login request to said user in response to said access request, said first login request associated with said first login stage of the FSM;

receiving, at the computing device, a response to said first login request, said response comprising response information addressing said first login request and response data indicating a response from a first push notification, in which said response information was entered by the user on said first device and communicated to said computing device;

parsing, via the computing device, said response, and identifying said response information and said response data;

analyzing, via the computing device, said response information, and based on said analysis, determining an authenticity of said response based on whether said response information comprises data corresponding to stored information associated with the first login request;

dynamically determining, via the computing device, based on said determined authenticity and said response data, a second login stage of the FSM, said determined second login stage comprising a second login request comprising information generated based on said authenticity, aid second login request being a type of login request that is based on said response data;

automatically communicating, via the computing device over the network, said second login request associated with the dynamically determined second login stage of the FSM to said user;

receiving, at the computing device, a second response to said second login request, said second response comprising response information addressing said second login request and response data indicating a response from a second push notification, in which said second response information was entered by the user on said first device and communicated to said computing device;

analyzing, via the computing device, said second response information, and based on said analysis, determining an authenticity of said second response based on whether said second response information comprises data corresponding to stored information associated with the second login request;

automatically determining, via the computing device, information to communicate to said first device of said user based on said second determined authenticity and said second response data, said information associated with a dynamically determined third stage of said FSM;

automatically communicating, via the computing device over the network, said determined information associated with the dynamically determined third stage to said first device, said communication resulting in said determined information of the third stage being displayed on a display of said first device;

determining, via the computing device a context of the resource;

communicating, over said network, said context to an ad platform, over the network, to obtain an advertisement associated with said context; and causing communication, over the network, of said identified advertisement to said first device for display in association with said determination of said third stage.

11. The non-transitory computer-readable storage medium of claim 10, wherein said information associated with said third stage of the FSM corresponds to a third login request, wherein said method further comprises:

receiving a third response to said third login request, said third response comprising information provided by said user;

automatically analyzing said third response in order to determine an authenticity of said third response information, said analysis comprising parsing said third response and determining whether said third response information corresponds to stored information associated with said third login request, said analysis further comprising parsing said third response information and identifying third network characteristics associated with said third response; and automatically determining fourth information to communicate to said first device, said fourth information associated with a fourth stage of said FSM, said fourth information is based on said third authenticity and said third network characteristics.

12. The non-transitory computer-readable storage medium of claim 10, wherein said information associated with said third stage of the FSM corresponds to a logged-in page associated with said secure resource.

13. The non-transitory computer-readable storage medium of claim 10, wherein said authenticity includes an indication that said response information matches the stored first login request information.

14. The non-transitory computer-readable storage medium of claim 10, wherein said authenticity of said response indicates that said response information is not correct.

15. The non-transitory computer-readable storage medium of claim 14, wherein said second login request comprises a different version of information requested in said first login request.

16. The non-transitory computer-readable storage medium of claim 14, further comprising:

communicating, to the first device, an electronic message indicating that said access request has been denied.

17. A computing device comprising:

a processor; and a non-transitory computer-readable storage medium for tangibly storing thereon program logic for execution by the processor, the program logic comprising:

logic executed by the processor for receiving, at the computing device, an access request from a user to access a secure resource from a first device associated with the user, said computing device controlling access to said secure resource by using a finite state machine (FSM) that is dynamically configured with a first login stage and subsequent login stages, a type and amount of said subsequent login stages being automatically and dynamically determined based on responses to login requests of each previous login stage, each response to each login request at each stage of the FSM comprises information selected from a group consisting of: network data, network activity, device characteristics, user behavior, user location, user identity, and a type of web-based resource;

logic executed by the processor for automatically communicating, via the computing device over a network, a first login request to said user in response to said access request, said first login request associated with said first login stage of the FSM;

logic executed by the processor for receiving, at the computing device, a response to said first login request, said response comprising response information addressing said first login request and response data indicating a response from a first push notification, in which said response information was entered by the user on said first device and communicated to said computing device;

logic executed by the processor for parsing, via the computing device, said response, and identifying said response information and said response data;

logic executed by the processor for analyzing, via the computing device, said response information, and based on said analysis, determining an authenticity of said response based on whether said response information comprises data corresponding to stored information associated with the first login request;

logic executed by the processor for dynamically determining, via the computing device, based on said determined authenticity and said response data, a second login stage of the FSM, said determined second login stage comprising a second login request comprising information generated based on said authenticity, aid second login request being a type of login request that is based on said response data;

logic executed by the processor for automatically communicating, via the computing device over the network, said second login request associated with the dynamically determined second login stage of the FSM to said user;

logic executed by the processor for receiving, at the computing device, a second response to said second login request, said second response comprising response information addressing said second login request and response data indicating a response from a second push notification, in which said second response information was entered by the user on said first device and communicated to said computing device;

logic executed by the processor for analyzing, via the computing device, said second response information, and based on said analysis, determining an authenticity of said second response based on whether said second response information comprises data corresponding to stored information associated with the second login request;

logic executed by the processor for automatically determining, via the computing device, information to communicate to said first device of said user based on said second determined authenticity and said second response data, said information associated with a dynamically determined third stage of said FSM;

logic executed by the processor for automatically communicating, via the computing device over the network, said determined information associated with the dynamically determined third stage to said first device, said communication resulting in said determined information of the third stage being displayed on a display of said first device;

logic executed by the processor for determining, via the computing device a context of the resource;

logic executed by the processor for communicating, over said network, said context to an ad platform, over the network, to obtain an advertisement associated with said context; and logic executed by the processor for causing communication, over the network, of said identified advertisement to said first device for display in association with said determination of said third stage.

18. The computing device of claim 17, wherein said information associated with said third stage of the FSM corresponds to a third login request, wherein said method further comprises:

logic executed by the processor for receiving a third response to said third login request, said third response comprising information provided by said user;

logic executed by the processor for automatically analyzing said third response in order to determine an authenticity of said third response information, said analysis comprising parsing said third response and determining whether said third response information corresponds to stored information associated with said third login request, said analysis further comprising parsing said third response information and identifying third network characteristics associated with said third response; and logic executed by the processor for automatically determining fourth information to communicate to said first device, said fourth information associated with a fourth stage of said FSM, said fourth information is based on said third authenticity and said third network characteristics.

* * * * *